United States Patent [19]

Oono

[11] Patent Number: 4,886,362

[45] Date of Patent: Dec. 12, 1989

[54] APPRATUS FOR MEASURING THE PROFILE OF AN ASPHERICAL SURFACE

[75] Inventor: Masahiro Oono, Tokyo, Japan

[73] Assignee: Asahi Kogaku Kogyo Kabushiki Kaisha, Tokyo, Japan

[21] Appl. No.: 84,766

[22] Filed: Aug. 13, 1987

[30] Foreign Application Priority Data

Aug. 13, 1986 [JP] Japan ................................ 61-190889

[51] Int. Cl.$^4$ ................................................ G01B 9/02
[52] U.S. Cl. ..................................... 356/349; 356/360
[58] Field of Search ........................ 356/349, 359, 360

[56] References Cited

U.S. PATENT DOCUMENTS 4,576,479  3/1986  Downs ............................ 356/359 X
4,611,916  9/1986  Yoshizami ........................ 356/349
4,714,346 12/1987  Eichen et al. ..................... 356/349

Primary Examiner—Davis L. Willis
Assistant Examiner—Matthew W. Koren
Attorney, Agent, or Firm—Sughrue, Mion, Zinn, Macpeak & Seas

[57] ABSTRACT

An apparatus for measuring the profile of an aspherical surface in which two coherent optical beams of closely spaced frequencies are produced. One of the beams is reflected from either an optical probe or a mechanical feeler probe coupled with the turning aspherical surface. The reflected and non-reflected beams interfere and the resultant beat signal is detected and its frequency change measured to determine the differing optical path length to the turning aspherical surface. The mechanical probe has a feeler biased into contact with the aspherical surface and a reflector fixed thereto for reflecting the one beam. The optical probe has an auto-focusing objective lens for focusing the one beam to be reflected from the turning asperical surface.

4 Claims, 2 Drawing Sheets

# APPRATUS FOR MEASURING THE PROFILE OF AN ASPHERICAL SURFACE

BACKGROUND OF THE INVENTION

1. Field of the Invention

The present invention relates to an apparatus for measuring the surface profile of aspherical photographic lenses and other aspherically surfaced optical components. More specifically, the present invention relates to an apparatus for measuring the profile of an aspherical surface by the polar coordinate system in which the aspherical surface to be analyzed is rotated about an axis that passes through the center of a reference spherical surface approximate to the aspherical surface and which is perpendicular to the optical axis of said aspherical surface. The profile of the aspherical surface of interest is measured based on the resultant angle of rotation and the amount of deviation from the radius of rotation.

2. Prior Art of the Invention

The principle of measurement of the profile of an aspherical surface by the polar coordinate system is illustrated in FIG. 1. An aspherical surface 1 to be analyzed is rotated about an axis 3 that passes transversely through the center of curvature of an approximate reference spherical surface 2 with a radius of curvature R and which is perpendicular to the optical axis of the aspherical surface 1. The profile of the aspherical surface 1 of interest is determined on the basis of measurement of the angle of rotation $\theta$ and the amount of deviation $\Delta R$ between the profile of the surface 1 and the surface Z along the radius of rotation. A prior art apparatus that is operated on this principle is shown schematically in FIG. 2.

The aspherical surface 1 to be analyzed (hereinafter simply referred to as the surface of interest) is mounted in such a way that the center of curvature of a reference surface that approximates the aspherical surface 1 of interest is in alignment with the axis of rotation 3 of a rotating means 4. When the surface of interest is rotated about a transverse axis 3 by an angle $\theta$, a certain amount of deviation $\Delta R$ from the radius of rotation occurs. This deviation $\Delta R$ is sensed as the amount of movement of a mechanical feeler 6 that is guided by a bearing 5 while being kept in biased contact at one end with the aspherical surface 1. The other end of the feeler 6 is provided with a reflective mirror 7, such as a cat's eye mirror, that is designed to move the same distance as that traveled by the feeler 6. The bearing 5, feeler 6 and reflective mirror 7 attached to the feeler 6 constitute the principal components of a contact probe 8.

Detection of the amount of deviation $\Delta R$ from the radius of rotation is achieved by a laser length metering system 9 operating by the heterodyne interference method. A suitable laser length metering system operating on the principle of heterodyne interference may be selected from among the products of Hewlett-Packard Company, say Model HP 5528A. This model is known to be the most convenient and reliable length metering apparatus available today.

Both the angle $\theta$ and the deviation $\Delta R$ are detected by the rotating means 4 and the length measuring system 9, respectively, to thus provide a measurement of asphericity. The measurement of the angle $\theta$ may be done by an angular encoder attached to a slowly turning motor driving a turntable on which the aspherical surface rests.

The operating principle of the laser length metering system 9 is as follows. Two beams of light emerging from a Zeeman laser 10 that are polarized in directions transverse to each other and which have slightly different frequencies $f_1$ and $f_2$ are incident on a beam splitter 11 from which part of the light is separated and detected with a low frequency photo detector 12 at a beat frequency $f_1-f_2$.

While the beam splitter 11 transmits the remaining components of light, one component having the frequency $f_2$ is guided through a polarizing beam splitter 13 to encounter a reference cat's-eye mirror 14, from which it is reflected and falls upon and is detected by a low frequency photodetector 15 as reference light. The other component having the frequency $f_1$ falls upon a reflective mirror 7 after passing through the beam splitter 11. The frequency of the light reflected from the reflective mirror 7 is Doppler-shifted from $f_1$ to $f_2+\Delta f$ by the instantaneous velocity of the displacement of the mirror 7 that results in the displacement $\Delta R$. The time integral of the Doppler shift is indexed by the rotation angle as the aspherical surface 1 is turned to indicate the amount of deviation of the aspherical surface 1 of interest. As a result of interference by the reference light, the light detected at the photodetector 15 has a beat frequency equal to $f_1-f_2+\Delta f$.

The outputs of the two detectors 12 and 15 are counted by peak or zero-crossing counters 31 and 32 and these counts are differenced in a subtracter 33. The output of the subtracter 33 is a time integral of $\Delta f$, i.e. $\Delta \Phi$, and thus is proportional to $\Delta R$, resulting from the rotation of the aspherical surface 1.

A calculation circuit 34 converts between $\Delta \Phi$ and $\Delta R$ dependent upon the frequency $f_1$ or $f_2$. This deviation $\Delta R$ is paired with the measured angle $\theta$ from the turning means 4.

The prior art apparatus of the type contemplated by the present invention has the advantage that it ensures a very high precision in measurement and that it is capable of achieving profile measurement of a non-specular surface. On the other hand, this apparatus is not suitable for measurement of the profile of a finished surface or other vulnerable surfaces such as those of finished products.

SUMMARY OF THE INVENTION

An object, therefore, of the present invention is to provide an apparatus for measuring the profile of an aspherical surface that solves the aforementioned problems of the prior art by employing, in addition to the contact probe, a non-contact probe that is interchangeable with the contact probe and which is capable of surface profile measurement without damaging the surface of interest.

This object of the present invention can be attained by an apparatus for measuring the profile of an aspherical surface by detecting both the angle of rotation $\theta$ and the amount of displacement $\Delta R$ in the direction of the radius of rotation. The angle of rotation $\theta$ results when the aspherical surface to be analyzed is rotated about an axis that passes through the center of a reference spherical surface approximate to said aspherical surface and which is perpendicular to the optical axis thereof. The amount of displacement $\Delta R$ is the amount of movement of a feeler in contact with the aspherical surface which combines with a reflective mirror to make up a contact probe. The reflector mirror is movable together with the feeler. The amount of movement of the feeler results in the amount of variation, $\Delta f$, in the beat frequency that occurs as a result of interference between light having a frequency ($f_2$) reflected from a reference mirror and the light reflected from the reflector mirror which has received light having a frequency ($f_1$) that is slightly different from $f_2$. The apparatus is improved by further including a non-contact probe that is interchangeable with the contact probe and which comprises an objective lens having an auto-focusing capability that constantly converges rays of light on the surface to be analyzed. Light-separating means direct to light detecting means the light that has reflected through the objective lens from the surface to be analyzed. An optical element produces a focus error signal by means of the separated light. The light detecting means detect the focus error signal. Drive means drive the objective lens based on the focus error signal.

DESCRIPTION OF THE PREFERRED EMBODIMENTS

Figure 2:
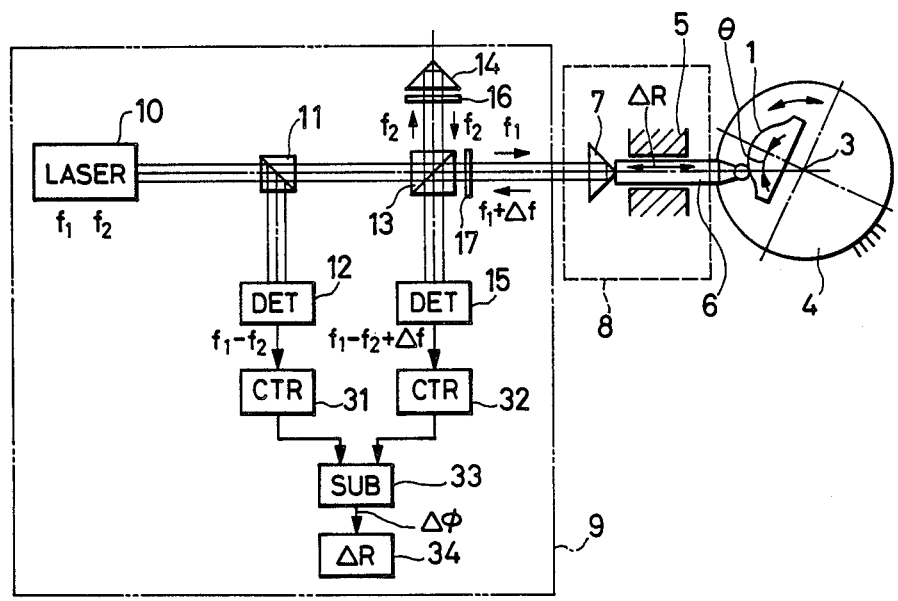
FIG. 2 is an illustration of a prior art apparatus.
Figure 3:
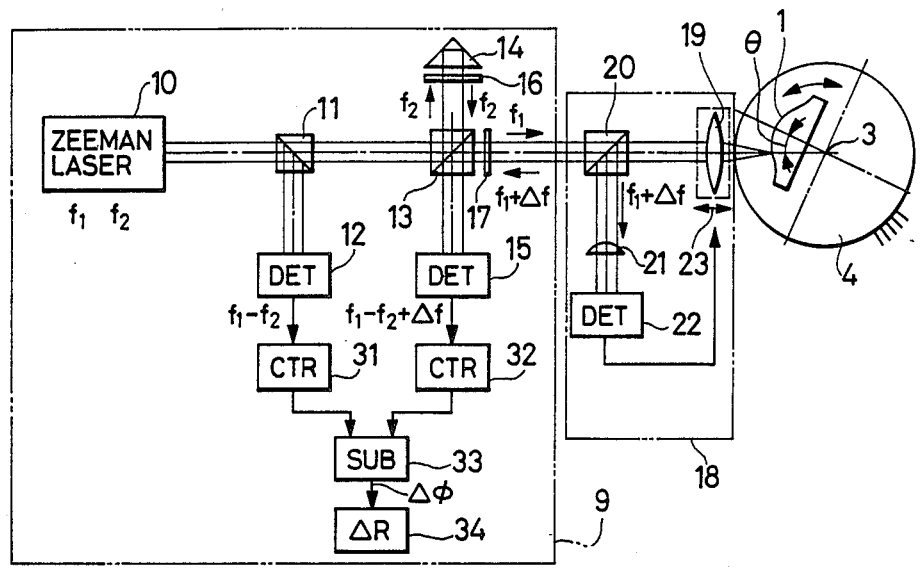
FIG. 3 is a diagram showing schematically an apparatus according to one embodiment of the present invention.

An embodiment of the apparatus of the present invention is hereunder described with reference to FIG. 3, in which the components that are the same as those employed in the prior art apparatus are identified by like numerals for the sake of clarity. The principal difference between the apparatus shown in FIG. 3 and the prior art apparatus shown in FIG. 2 is that the former includes a non-contact probe 18 which is hereunder described in greater detail.

Figure 1:
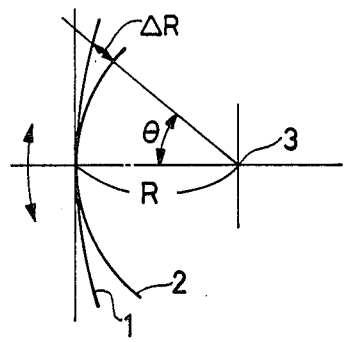
FIG. 1 is a diagram showing the principle of determining the profile of an aspherical surface.

Light from a Zeeman laser 10 is introduced into an objective lens 19 having an auto-focusing capability that constantly converges rays of light on the aspherical surface 1 to be analyzed. The light reflected from the aspherical surface 1 is sent back through the objective lens 19 and falls onto a low frequency photodetector 15 after passing through a beam splitter 20 (light-separating means) and a polarizing beam splitter 13. The aspherical surface 1 is rotated by an angle $\theta$ about the axis of rotation 3 of rotating means 4 which is aligned with the center of curvature of a reference spherical surface 2 (see FIG. 1) approximating the aspherical surface 1. As a result, the reflected light from the aspherical surface 1 is Doppler-shifted during the rotation according to the variation rate in the radius of rotation, producing a change in frequency $\Delta f$ relative to that of the incident light.

This frequency change $\Delta f$ is preferentially detected by the photodetectors 15 and 12, preferentially integrated by the counters 31 and 32 so as to determine a phase change $\Delta\Phi$ in the subtracter 33 and thus the amount of deviation from the radius of rotation R, or the amount of displacement, $\Delta R$, of the aspherical surface 1.

In order to ensure that the light reflected from the aspherical surface 1 will be collimated toward the photodetector 15, the light is directed into the beam splitter 20 and part of it is introduced into a photodetector 22 that generates a focus servo signal for the objective lens 19. Focus servo action is performed to move the objective lens 19 in such a way that incident light will constantly be converged on the surface 1. This automatic focusing may be accomplished by any known auto-focusing technique such as, for example, applying servo feed back after astigmatism is introduced in the reflected light by means of a cylindrical lens 21 serving as an optical element for generating a focus error signal. In response to a signal from the photodetector 22 and to the action of an objective lens drive means 23, the rays of light incident upon the objective lens 19 are constantly converged to focus on the aspherical surface 1, thereby ensuring that the reflected light from the surface 1 is directed into the photodetector 15.

Figure 4:
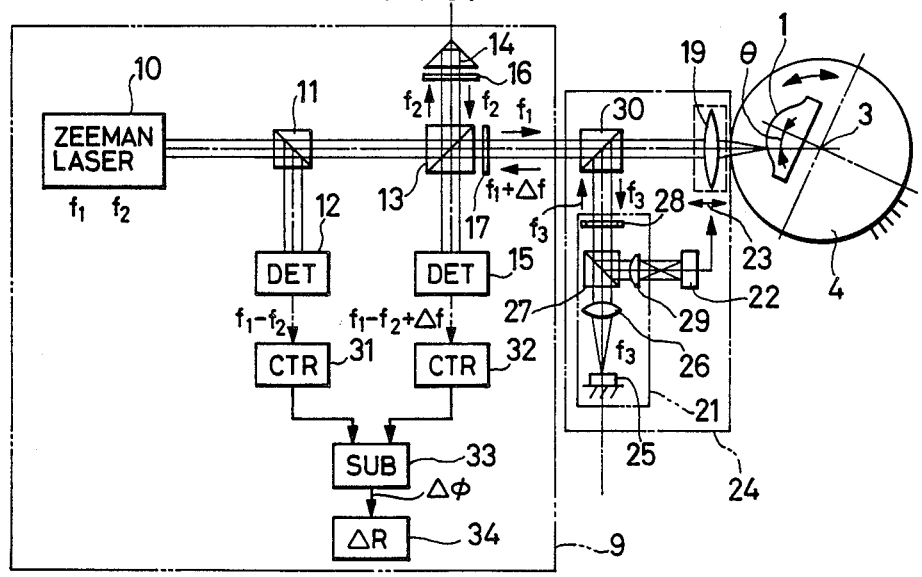
FIG. 4 is a diagram showing schematically an apparatus according to a second embodiment of the present invention.

FIG. 4 shows a second embodiment of the apparatus of the present invention, in which a non-contact probe 24 has the same configuration as that of the optical system employed in a pickup unit for a known compact disk or video disk player. Light having a frequency of $f_3$ emitted from a semiconductor laser 25 is collimated with a collimator lens 26 and passes through a polarizing beam splitter 27 and a dichroic mirror 30 that transmits light having the frequency $f_1$ and reflects light having the frequency $f_3$. The light from the dichroic mirror 30 is converged by an objective lens 19 to focus on the aspherical surface 1. The light having the frequency $f_3$ that is reflected from the aspherical surface 1 travels back along the same path (i.e., through the objective lens 19, dichroic mirror 30 and polarizing beam splitter 27) and is introduced into a photodetector 22 that generates a focus servo signal. The non-contact probe 24 further includes a quarter-wavelength ($\lambda/4$) plate 28 at the entrance to the auto-focusing section and a cylindrical lens 29 for imparting astigmatism to the reflect light. As in the first embodiment, focus servo is performed in response to the focus error signal from the photodetector 22 and to the action of an objective lens drive means 23. The objective lens 19 is designed to eliminate any chromatic aberration from the objective lens 19 for light having the frequencies $f_1$ and $f_3$.

The light wave having the frequency $f_1$ that emerges from the Zeeman laser 10 is converged by the objective lens 19 to focus on the aspherical surface 1. If the aspherical surface 1 is rotated by an angle $\theta$, the reflected light from the surface 1 is Doppler-shifted in accordance with the variation rate in the radius of rotation R, producing a change in frequency from $f_1$ to $f_1 + \Delta f$. This amount of frequency change $\Delta f$ is differentially detected by photodetectors 15 and 12, integrated by the counters 31 and differenced in the subtracter 33 so as to determine the amount of displacement $\Delta R$ of the aspherical surface 1.

As described in the foregoing, the apparatus of the present invention employs not only a contact probe but also a non-contact probe that is readily interchangeable with the contact probe and which operates on the principle of optical heterodyne interference. This adds great commercial value to the apparatus of the present invention in that it enables the profile of an aspherical surface to be analyzed with great accuracy without damaging it.

What is claimed is:

1. An apparatus for measuring the profile of an aspherical surface, comprising means for turning an aspherical surface through a determined angle $\theta$ about an axis, an optical probe for detecting an amount of displacement $\Delta R$ in a radial direction of said turning aspherical surface, and an optical measuring circuit, wherein said optical measuring circuit comprises:

a source of a first beam and a second beam light of different respective frequencies $f_1$ and $f_2$;

first means for detecting a beat signal arising from interference between said first and second beams; and means for deriving a variation of a frequency of said beat signal, said variation being related to said displacement $\Delta R$; and wherein said optical probe comprises:

an auto-focusing objective lens for continuously converging said first beam onto said turning aspherical surface;

light separating means for directing light reflected from said aspherical surface to said optical measuring circuit;

a source of focusing light incident upon said light separating means and reflected by said light separating means onto said aspherical surface, said light separating means directing said light reflected from said aspherical surface toward said focusing light source;

means, interposed between said focusing light source and said light separating means, for reflecting said light reflected toward said focusing light source to produce focus error light;

means for receiving said focus error light and for producing a focus error signal accordingly; and drive means for driving said objective lens based on said focus error signal.

2. An apparatus as recited in claim 1, further comprising a contact probe interchangeable with said optical probe, said contact probe for detecting said amount of displacement $\Delta R$ comprising:

a feeler biased into contact with said turning aspherical surface; and a reflector fixed to said feeler for reflecting said first beam to said optical measuring circuit.

3. An apparatus as recited in claim 1:

wherein said optical measuring circuit further comprises second means for detecting a beat signal between said first and second beams not having been reflected from said turning aspherical surface; and wherein said driving means compares outputs of said first and second detecting means.

4. An apparatus as recited in claim 1, wherein said turning means turns said aspherical surface about an axis at a center of a circle closely aligned with said aspherical surface.

* * * * *